United States Patent [19]
Barabas

[11] 3,819,559
[45] June 25, 1974

[54] ALKYL ACRYLATE-CROTONIC ACID-POLY VINYL LACTAM GRAFT COPOLYMERS

[75] Inventor: Eugene S. Barabas, Watchung, N.J.

[73] Assignee: GAF Corporation, New York, N.Y.

[22] Filed: Dec. 6, 1972

[21] Appl. No.: 312,475

[52] U.S. Cl. 260/29.6 WB, 260/29.6 RW, 260/875, 260/885
[51] Int. Cl. ............................................ C08f 33/08
[58] Field of Search ............ 260/885, 875, 29.6 WB

[56] References Cited
UNITED STATES PATENTS
3,405,084  10/1968  Bobac et al.................... 260/29.6

FOREIGN PATENTS OR APPLICATIONS
1,068,283  5/1967  Great Britain.................... 260/885

OTHER PUBLICATIONS
Shah–Eur. Polym. J.–1968, 4(3) pp. 343–54(Eng.).

Primary Examiner—Murray Tillman
Assistant Examiner—C. J. Seccuro
Attorney, Agent, or Firm—Walter C. Kehm; Sampson B. Leavitt

[57] ABSTRACT

A graft copolymer of a monomer mixture comprising an acrylic acid ester; and crotonic acid, graft polymerized on a poly (N-vinyl lactam) of the formula

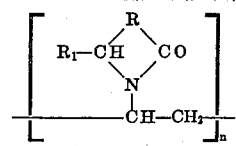

wherein R represents an alkylene bridge group containing from 2 through 4 carbon atoms, $R_1$ represents a member of the group consisting of hydrogen and methyl and n represents the number of the N-vinyl lactam units; stable aqueous emulsions containing same and methods of production.

10 Claims, No Drawings

ALKYL ACRYLATE-CROTONIC ACID-POLY VINYL LACTAM GRAFT COPOLYMERS

BACKGROUND OF THE INVENTION

The present invention relates, in general, to stable aqueous emulsions and, in particular, to stable, aqueous dispersions or latices containing dispersed particles comprising a polymeric N-vinyl lactam having grafted thereon as side chains, units of an alkyl ester of an $\alpha$-,$\beta$-unsaturated carboxylic acid and crotonic acid.

Graft copolymers comprising a basic homopolymer chain having grafted thereon units or a plurality of such units of one or more polymerizable monomers, in chain form, represent an interesting and important development in the resin arts, particularly since such graft copolymers find immediate and practical utility for the resin chemist to utilize them as "building block" resin systems or "module" resin systems which can be employed to "tailor-make" subsequent resin systems to quite specific industrial needs. Graft copolymers can be made by a variety of polymerization methods including solution, emulsion or bulk polymerization and the like.

Copolymers of N-vinyl lactams, and particularly N-vinyl pyrrolidone, with various unsaturated compounds, are well known in the art and have been used in industry as coatings, textile sizes, adhesives and the like. However, in the formation of these polymers previously, it has not been possible to introduce crotonic acid groups into the copolymers. U.S. Pat. No. 3,686,150 does, however, teach the formation of straight interpolymers thereof. Polymers containing carboxylic acid groups are highly desirable as such groups represent a functionality useful both for yielding a wide variety of products, and for producing sizes and coatings of high abrasion resistance durability, etc., by reacting the functional groups with additives suitable for crosslinking.

In U.S. Pat. No. 3,244,658, there is disclosed and claimed film-forming copolymers of N-vinyl lactams, e.g., N-vinyl pyrrolidone, and mono- or half esters of unsaturated monocarboxylic acids, the copolymers being produced by the copolymerization of an acrylic acid ester monomer with an N-vinyl lactam in the presence of a polymerization catalyst. U.S. Pat. No. 3,405,084 discloses interpolymers (non-graft) of the latter two monomers plus the addition of an unsaturated acid, such as acrylic. U.S. Pat. No. 2,996,471 teaches copolymers of crotonic acid and vinyl acetate. The present invention provides a graft terpolymer, the properties of which can be varied over a very wide range while retaining the valuable carboxylic acid functionality.

It is known that unsaturated carboxylic acids copolymerize with vinyl lactams very poorly, and give products of low molecular weight. This phenomenon is due to the partial decomposition of the latter by former, which reaction liberates acetaldehyde, a strong chain transfer agent.

The method described in the present invention makes possible the preparation of copolymers of vinyl lactams containing carboxylic acid units.

Graft copolymers, as is well known in the art, may be prepared by the irradiation or free radical polymerization of solutions of linear homopolymers in another monomer or monomers. The reaction mechanism is believed to cause the dislodgment of hydrogen atoms or ions, forming activated centers along the homopolymer chain from which branches grow; the latter produced copolymer being in contrast to an interpolymer. Inasmuch as the graft copolymer has a much "coarser" alternation of mesomers than does the interpolymer, the chemical properties thereof are affected. Graft copolymers tend to exhibit properties of each of the monomeric units, in contrast to interpolymers which only exhibit properties intermediate between those of the monomers.

One of the distinguishing features of the instant graft terpolymers is that the crotonic acid monomer component does not homopolymerize, this being in contradistinction to acids such as acrylic and methacrylic. This fact prevents the formation of side chain units of homopolymers of crotonic acid from being graft polymerized on the substrate, thus producing polymers with a more uniformly distributed carboxyl functionality along the chain. This property of crotonic acid is a distinct advantage over other unsaturated polymerizable carboxylic acids, whenever the uniformity of functional group distribution is of importance.

SUMMARY OF THE INVENTION

Accordingly, it is one object of this invention to provide new graft copolymers of N-vinyl lactams and compounds which provide a carboxylic acid function in the polymer and which copolymers also overcome or otherwise mitigate the problems of the prior art.

A further objective of this invention is to provide graft copolymers of N-vinyl lactams, units of crotonic acid and an acrylic acid ester monomer.

Another object of this invention is to provide improved polymeric materials which can be used as coatings, textile sizes, adhesives, polishes and the like and contain functional groups which enable them to be converted to a still wider variety of products.

Further objects and advantages of the invention will become apparent from the following detailed description thereof.

According to this invention, satisfaction of these objects and advantages is achieved by the reaction of a homopolymer of approximately by weight 10 to 70 percent (a) an N-vinyl lactam; (b) 1 to 20 percent crotonic acid; and (c) 10 to 89 percent acrylic acid ester monomer, which graft copolymers possess properties superior to those known in the art. The polymeric compositions prepared according to this invention are high molecular weight graft copolymers of the components, the polymerization thereof being effected through the double bonds of the reactants, i.e., by vinyl polymerization.

Another object of this invention is the preparation of the aforesaid polymers in aqueous systems to form stable emulsions; the arrangement of the monomer units also being an essential part of the invention. In the polymers described in the present invention, the homopolymer of the N-vinyl lactam is in the main chain, while the side chains are composed of the units of the acrylic acid ester and the units of crotonic acid. These side chain units are attached to the main chain by grafting techniques.

DESCRIPTION OF PREFERRED EMBODIMENTS

As indicated above, the polymers of this invention are prepared by the reaction of (a) a polymer of an N- vinyl lactam, (b) crotonic acid, and (c) an acrylic acid ester monomer.

The polymeric N-vinyl lactams utilized in the preparation of the compositions of this invention are characterized by the following general structural formula:

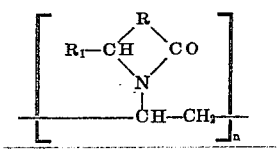

wherein R represents an alkylene bridge group necessary to complete a 5, 6 or 7-membered heterocyclic ring system, $R_1$ represents either hydrogen or a methyl group, and $n$ represents a number indicative of the extent of polymerization and is usually at least 3 or 4.

All of the specific polymeric materials characterized by the foregoing general formula are commercially available and called polymeric N-vinyl lactams. They are obtained by polymerizing organic 5, 6 or 7-membered ring compounds containing in their rings the — NH — CO-group, such as, for example, N-vinyl-2-pyrrolidone,
N-vinyl-2-piperidone,
N-vinyl-2-caprolactam,
N-vinyl-3-methyl-2-pyrrolidone,
N-vinyl-3-methyl-2-pipidone, or
N-vinyl-3-methyl-2-caprolactam,
N-vinyl-4-methyl-2-pyrrolidone,
N-vinyl-4-methyl-2-piperidone, or
N-vinyl-4-methyl-2-caprolactam,
N-vinyl-5-methyl-2-pyrrolidone,
N-vinyl-5-methyl-2-piperidone,
N-vinyl-3-ethyl-2-pyrrolidone,
N-vinyl-4,5-dimethyl-2-pyrrolidone,
N-vinyl-5,5-dimethyl-2-pyrrolidone,
N-vinyl-3,3,5-trimethyl-2-pyrrolidone,
N-vinyl-5-methyl-5-ethyl-2-pyrrolidone,
N-vinyl-3,4,5-trimethyl-3-ethyl-2-pyrrolidone,
N-vinyl-6-methyl-2-piperidone,
N-vinyl-6-ethyl-2-piperidone,
N-vinyl-3,5-dimethyl-2-piperidone,
N-vinyl-4,4-dimethyl-2-piperidone,
N-vinyl-7-methyl-2-caprolactam,
N-vinyl-7-ethyl-2-caprolactam,
N-vinyl-3,5-dimethyl-2-caprolactam
N-vinyl-4,6-dimethyl-2-caprolactam and
N-vinyl-3,5-7-trimethyl-2-caprolactam.

Of these several compounds, N-vinyl-2-pyrrolidone is most preferred as it is readily available and provides products having excellent properties.

Depending upon the extent of polymerization, they have molecular weights ranging from at least 400 up to 2,000,000 or more. Viscosity measurements are commonly used as an indication of the average molecular weight of polymeric compositions, the instant polymers being characterized by a chain of carbon atoms to which the lactam rings are attached through their nitrogen atoms:

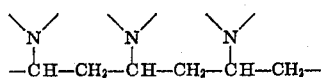

The K value (Fikentscher) of any particular mixture of polymers is calculated from viscosity data and is useful as an indication of the average molecular weight of such mixture. Its determination is fully described in "Modern Plastics," 23, No. 3, 157–61, 212, 214, 216, 218 (1945), and is defined as 1,000 times $k$ in the empirical relative viscosity equation:

$$\log_{10} n_{rel}/C = [75k/(1 + 1.5kC)] + k$$

wherein $C$ is the concentration in grams per hundred cc. of polymer solution and $n_{rel}$ is the ratio of the viscosity of the solution to that of pure solvent. The K values are reported as 1,000 times the calculated viscosity coefficient in order to avoid the use of decimals. For the purpose of the present invention, there may be employed those polymeric N-vinyl lactams having a K value of about 10 to 200, preferably of 30 to 100 because of their viscosity at lower concentrations.

K values and specific viscosities ($n_{sp}$) are interconvertible and are related through relative viscosity ($\pi_{rel}$). Thus, when viscosity measurements are taken on solutions which have a concentration of 1.00 gram of polymer per deciliter of solution at 25°C. ($C=1$), the relationships are as follows:

$$\pi_{rel} = n_{sp} + 1$$

Relative viscosity = specific viscosity plus one.
Relative viscosity = $10[0.001K + 0.000075K^2/(1 + 0015K)]$.
Hence, $N_{sp} = -1 + 10[0.001K + 0.000075K^2/(1 + 0.0015K)]$.

Relative viscosity, specific viscosity and K are dimensionless, whereas inherent viscosity $$(\log_e n_{rel})/C$$

and intrinsic viscosity (the limit of inherent viscosity as $C$ approaches zero) have the dimensions of dilution, i.e., the reciprocal of concentration. Intrinsic viscosity and K are intended to be independent of concentration.

The number of recurring polymer units enclosed by brackets in the foregoing general structural formula, indicated by $n$, or the extent of degree of polymerization, corresponds to a chain of roughly 4 to 20,000 monomer units or more. In actual practice, a mixture of polymeric molecules, each containing a different number ($n$) of monomer units, is always produced. The polymers are readily prepared by the procedural steps given in U.S. Pat. Nos. 2,265,450, 2,317,804 and 2,335,454 and in which working examples of all the species characterized by the above formula are given and all of which are incorporated herein by reference thereto. The acrylic ester monomer (or mixtures thereof) employed herein may be any ester of acrylic, methacrylic, α-ethacrylic, or α-chloracrylic acid with a monohydroxylic organic compound referred to herein as a monohydric alcohol, which may be saturated or unsaturated, aromatic or aliphatic, straight or branched chain, substituted or unsubstituted. As examples of suitable monohydroxylic organic compounds which may be employed for esterifying one of the above-mentioned acrylic acids, there may be mentioned such alcohols such as methyl, ethyl, propyl, butyl, isobutyl, 2-ethyl hexyl, amyl, hexyl, cyclohexyl, heptyl, dodecyl, octyl, oxo tridecyl, tetradecyl, pentadecyl, hexadecyl, octadecyl, oleyl, arachidyl, ceryl, dimethyl-aminoethyl, teriary-butylaminoethyl, and benzyl alcohol in addition to phenol, naphthol and the like. The lower alkyl acrylates being preferred.

While not wishing to be bound by any particular theory or mechanism of reaction, it is believed that the arrangement of the monomeric units, that is, the acrylic acid esters and crotonic acid, is an important part of the invention in relation to the polymeric N-vinyl lactam. With respect to the graft copolymers of the present invention, the above units are not situated in the main polymer chain but rather they form a more or less alternating side chain on the preformed N-vinyl lactam, such as polyvinyl pyrrolidone, which forms the skeletal chain for the addition of said monomeric units.

As pointed out above, it is believed that the arrangement of the monomer units in the final graft polymer structure, as side chains composed of said units pendant from the skeletal chain of the preformed N-vinyl lactam such as, polyvinyl pyrrolidone, represents an important aspect of the present invention and as such the novel graft polymers can be readily and conveniently prepared by subjecting a suitable mixture of an N-vinyl lactam, such as poly(N-vinyl pyrrolidone) and said monomeric units to polymerization conditions whereby vinyl-type polymerization occurs through the ethylenically unsaturated groups of the monomers. Such means of vinyl-type polymerization are well known in the art and include inducing means for initiating polymerization, such as the use of high energy radiation, including gamma radiation, X-rays and the like or by the use of a free radical type catalyst, such as a free radical producing redox-system which is preferred.

Broadly speaking, the invention includes the provisions of a graft copolymer of a monomer mixture comprising approximately by weight
  a. 80 to 99 percent of an acrylic acid ester; and
  b. 1 to 20 percent crotonic acid graft polymerized on a poly(N-vinyl lactam) substrate; a stable aqueous emulsion containing same, a latex derived therefrom and a process for producing both the emulsion and the graft copolymer.

The graft copolymer system described in present invention can be varied over a wide range by:
  a. changing the ratio of the comonomers;
  b. varying the ester-group;
  c. using various ethylenically unsaturated esters;
  d. the combination of (a) to (c).

It will be seen therefore that the resulting graft copolymer with units containing the carboxylic acid group as well as the ethylenically unsaturated ester provide functionalities through which the resultant polymer may be subjected to various chemical reactions to yield a variety of products. Thus, the polymers of the invention provide a wide and flexible range of properties for film-forming polymers.

The ratio of each of these reactants may be varied as desired over a wide range consistent with attainment of the desired properties. However, for obtaining optimum properties of the polymers, the following ratios by weight of the monomers are preferred:

| Monomer | Parts by Weight |
| --- | --- |
| Poly(N-vinyl lactam) | 20 to 50 |
| Acrylic acid ester | 40 to 77 |
| Crotonic acid | 3 to 10 |

For the preparation of the graft polymers of the invention, the polymer first has to be activated with a water soluble activator (e.g., ammonium persulfate) at elevated temperatures. This treatment creates active sites along the polymer chain rendering it suitable for the attachment of monomeric units by grafting. The monomers are then introduced into the reaction system containing the activated polymeric N-vinyl lactam, such as, poly(N-vinyl pyrrolidone). Where permissible, it is preferred to carry out the reaction by dissolving or dispersing the reactants in an aqueous solution in the desired concentrations in the presence of a catalyst for initiation of the polymerization. In addition to free radical producing redox catalyst systems, which are preferred for use herein, other catalysts can be employed and include percompounds such as organic and inorganic peroxides, for example, benzoyl peroxide, cumene hydroperoxide, hydrogen peroxide, acetyl peroxide, lauroxyl peroxide or persulfates; such as, alkali metal persulfates; such as, sodium and potassium persulfates, ammonium persulfate and the like; perborates, such as, sodium, potassium and ammonium perborates; as well as azobis-nitriles; such as, azo bis-isobutyrlnitrile. If desired mixtures of catalyst can be employed.

The catalyst concentration in the reaction system is not necessarily a critical feature of the invention. The amount of catalyst can be varied over a wide range, but advantageously, an amount of catalyst of from about 0.01 to 2.0 weight percent or more can be employed based on the total weight of reactants being polymerized.

The temperature at which the reaction is advantageously carried out can be varied over a wide range of from about $-10°C.$ and lower to about $180°C.$ and higher, however, it is preferred to conduct the graft polymerization reaction at a temperature of about $65°-75°C.$ in order to avoid an undesirably violent reaction. Graft polymerization temperatures of about $80°C.$ also provide products having the desirable physical characteristics of latex viscosity and molecular weight.

The graft polymerization reaction is normally carried out in a reaction vessel under the pressure of the monomers at any given reaction temperature, however, if desired, the pressure may be increased by the introduction of an inert gas such as nitrogen or Argon and the like. Additionally, the reaction is preferably carried out in the absence of free oxygen in order to provide optimum conditions for the graft polymerization reaction.

If desired, an activating agent such as an alkali metal sulfite or bisulfite, e.g., sodium, potassium, etc., sulfites and metabisulfites can be added to the polymerization reaction mixture in about the same amount as the polymerization catalyst in which case lower polymerization temperatures may be used. Chain regulators such as hexyl, cetyl, dodecyl, myristyl, etc., mercaptans can also be employed in the polymerizations. Suitable surface-active agents include fatty acid soaps, fatty alcohol sulfates such as sodium lauryl sulfate, potassium lauryl sulfate, etc., alkali metal salts of aromatic sulfonic acids, e.g., sodium isobutylnaphthalene sulfonate, etc., sulfosuccinic esters, γ-stearaminopropyl, dimethyl β-hydroxyethyl ammonium chloride, and the like.

The emulsions can be compounded with additives such as pigments, salts, wetting agents, resins, waxes and the like, thus providing a wide spectrum of products having wide industrial application.

It has also been found that stable emulsions of the class described above can be prepared without the use of emulsifying agents or protective colloids, although it has been observed that it is preferable to add such materials to the emulsion recipe in order to obtain high conversions and greater stability of the resultant emulsions.

These polymers, as indicated above, are useful as coatings, sizes, polishes, adhesives and in similarly related applications.

The polymers may also be crosslinked through the functional group by bifunctional compounds (e.g., glycols, diamines, diepoxy-compounds, etc.), by heat treatment or by other ways known in the art. By such treatment, increased solvent resistance, etc. may be achieved.

Some of the polymers of the invention are generally insoluble in water, alcohols, ketones, ethylacrylate, chlorinated solvents, aliphatic and aromatic hydrocarbons.

The following examples illustrate the invention but are not to be considered as limiting the same. In the examples, parts and percentages are by weight unless otherwise designated.

EXAMPLE I

Apparatus:
 5 liter resin kettle, equipped with mechanical stirrer, reflux condenser, dropping funnel, gas inlet tube and thermometer.
Procedure:
 1,500 g. distilled water is placed in the resin kettle 480 g. PVP/K-30, 10 g. "Igepal" CO-630 and 5 g. sodium acetate are added, and the mixture is stirred until a clear solution is obtained. The system is purged with nitrogen and heating is started. The solution is heated to 60°C. At this point 5 g. ammonium persulfate is added, and the heating is continued until 100°C. is reached. This temperature is held for 30 minutes. A uniform mixture of 430 g. butyl acrylate, 40 g. crotonic acid and 20 g. "Igepal" CO-630 is placed in a dropping funnel. The temperature of the kettle is lowered to 60°C. and one-fourth of the contents of the dropping funnel is added. The temperature is raised to 70°C. and the mixture agitated for 30 minutes. At this point 10 g. of a 5 percent ammonium persulfate solution is added and the mixture is stirred for 30 minutes. The rest of the comonomer is stirred for 1 hour at 70°C. The latex is cooled, and discharged through cheesecloth.

EXAMPLE II

Apparatus
 5 l resin kettle, equipped with mechanical stirrer, reflux condenser, dropping funnel, gas inlet tube and thermometer.
Procedure:
 1,500 g. distilled water is placed in the kettle, 480 g. PVP/K-30, 10 g. "Igepal" CO-630 and 5 G. sodium acetate are added. The system is purged with nitrogen, and heated to 60°C. At this point 5 g. ammonium persulfite is added, and the heating continued until 100°C. is reached. The temperature is held for 30 minutes. The system is cooled to 60°C. A uniform mixture of 430 g. ethylacrylate, 40 g. crotonic acid and 20 g. "Igepal" CO-630 is placed in a dropping funnel, and one-fourth of it added to the PVP solution. The temperature is raised to 70°C. and held for 30 minutes. After which 10 g. of a 5 percent ammonium persulfate solution is added and the system stirred at 70°C. for 30 minutes. The rest of the monomer mixture is introduced over a two hour period. After the addition is over, the mixture is held at 70°C. for 1 more hour. The system is allowed to cool under nitrogen, and then discharged through cheesecloth.

Analysis:
 Solids: 39.32 percent
 Res. Monomer: nil
 Crud: nil
 Brookfield Visc: 156 cps
 pH: 3.95

EXAMPLE III

Sample made by grafting 50 percent butylacrylate onto 50 percent PVP/K-30 was compared to the preparation described in Example I.

100 g. of each latex was placed in Erlenmeyer flasks, 0.4 g. 1,4-butanediol was added, and the mixtures were stirred for 5 minutes at room temperature. After that films were cast on glass-plates with the help of a 0.003 size doctor's knife.

The films were air-dried, then were placed in a preheated oven where they were kept at 150°C. for 15 minutes. The glass-plates were cooled to room temperature, then were submitted to wet-rubbing with water.

The film cast from the latex of Example I did not show evidence of remoistenability and kept its bond after 100 rubbings by hand.

The control-sample made without crotonic acid, showed evidence of remoistenability and lost its bond after 25 rubbings by hand.

In a similar manner other polymeric N-vinyl lactams, and alkyl esters of the class described, supra, can be employed in place of the poly N-vinyl pyrrolidone of Examples 1 and 2, with similar results obtaining.

It is obvious that numerous changes and modifications can be made in the invention without departing from the spirit and scope of the invention.

We claim:

1. A graft copolymer comprising 10 to 70 percent by weight of a poly(N-vinyl lactam) substrate having grafted thereon a monomer mixture comprising approximately by weight
 A. 80 to 99 percent of an acrylic acid ester; and
 B. 1 to 20 percent crotonic acid.

2. A graft copolymer as defined in claim 1 wherein said poly (N-vinyl lactam) has the formula

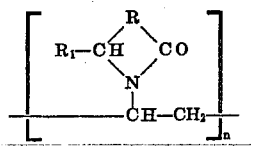

wherein R represents an alkylene bridge group containing from 2 through 4 carbon atoms, $R_1$ represents a member of the group consisting of hydrogen and methyl and n represents the number of the N-vinyl lactam units.

3. A graft copolymer as defined in claim 2 wherein said poly (N-vinyl lactam) is poly (N-vinyl pyrrolidone).

4. A graft copolymer is defined in claim 1 wherein component (A) is a lower alkyl acrylate.

5. A graft copolymer as defined in claim 1 wherein component (A) is included in amounts of 40 to 77 parts by weight.

6. A graft copolymer as defined in claim 1 wherein component (B) is included in amounts of 3 to 10 parts by weight.

7. A stable aqueous emulsion containing a graft copolymer as defined in claim 1.

8. A process for producing the stable aqueous emulsion as defined in claim 7 comprising subjecting said monomer mixture in an aqueous solution of said poly (N-vinyl lactam) to polymerization conditions in the presence of a water soluble emulsifying agent and a free radical supplying polymerization catalyst.

9. A process as defined in claim 8 wherein said polymerization is carried out at a temperature of from about −10°C. to about 180°C.

10. A process for producing a graft copolymer as defined in claim 1 comprising carrying out the process as defined in claim 8 followed by the additional step of separating from the resulting emulsion that graft copolymer contained therein.

* * * * *